United States Patent [19]
Chappell et al.

[11] Patent Number: 5,087,062
[45] Date of Patent: Feb. 11, 1992

[54] KNOCK-DOWN WHEELBARROW AND FASTENING DEVICES THEREFOR

[76] Inventors: Calvin T. Chappell, 16581 Timberlakes Dr. SW., Unit 203, Ft. Meyers, Fla. 33908; Randy T. Chappell, 5262 Hillsboro La., Las Vegas, Nev. 89120

[21] Appl. No.: 758,275

[22] Filed: Aug. 27, 1991

Related U.S. Application Data

[63] Continuation of Ser. No. 369,947, Jun. 22, 1989, abandoned.

[51] Int. Cl.[5] .............................................. B62B 1/20
[52] U.S. Cl. ................................ 280/47.31; 301/112; 403/298
[58] Field of Search ............... 280/47.31, 47.32, 653, 280/87.05; 301/112, 111; 411/455, 456; 483/298; 52/585; 446/465, 469

[56] References Cited

U.S. PATENT DOCUMENTS

| D. 168,503 | 12/1952 | Hallas | D34/15 A J |
|---|---|---|---|
| D. 239,125 | 3/1976 | Vota | D34/15 A J |
| D. 275,774 | 10/1984 | Petersson | D21/76 |
| 117,085 | 7/1871 | Lawrence | 280/653 |
| 351,095 | 10/1886 | Clark | 301/112 |
| 475,407 | 5/1892 | Marsh | 411/453 |
| 1,026,937 | 5/1912 | Taylor | 280/47.31 |
| 1,478,293 | 12/1923 | Parsons | 280/47.31 |
| 2,035,081 | 3/1936 | Lower | 446/469 |
| 2,291,557 | 7/1942 | Parrish | 301/112 |
| 2,381,618 | 8/1945 | Roberts | 446/96 |
| 2,764,845 | 10/1956 | Colombini | 280/47.31 |
| 3,506,319 | 4/1970 | Tunnell | 280/47.31 |
| 3,527,486 | 9/1970 | Gamp | 403/298 |
| 3,883,257 | 5/1975 | Delafield | 403/298 |
| 4,690,656 | 9/1987 | Friedman et al. | 446/469 |

FOREIGN PATENT DOCUMENTS

| 2607754 | 6/1988 | France | 301/112 |
| 885 | of 1861 | United Kingdom | 411/456 |

Primary Examiner—David M. Mitchell
Attorney, Agent, or Firm—Robert C. Kain, Jr.

[57] ABSTRACT

The knock-down wheelbarrow includes four side units and a bottom unit that are generally planar. The side units and bottom unit form an open topped box structure. These units have respective interfacing surface portions that are adjacent each other. A plurality of partial bores are located on the interfacing surface portions. The side units and bottom unit are attached together via fastener pins. Each pin has radially protruding serrations and the serrations along each end length of each pin are oppositely disposed. Each pin is inserted into a pair of partial bores thereby locking the interfacing surfaces together. The knock-down wheelbarrow also includes a pair of support beams and each support beam includes a partial bore on a top surface, a partial bore on a bottom surface and a lateral through bore at a fore end of the beam. The wheelbarrow also includes a pair of legs having top end interfacing surfaces with partial bores therein. Fastener pins attach each leg to the bottom surface of a support beam. The knock-down wheelbarrow also includes a wheel with an axial through passage and an insertable, lockable axle which is adapted to be inserted through both lateral through bores of the support beams and the axial passage of the wheel when the wheel is intermediate the support beams.

7 Claims, 4 Drawing Sheets

KNOCK-DOWN WHEELBARROW AND FASTENING DEVICES THEREFOR

This is a continuation of application Ser. No. 369,947, filed on June 22, 1989, now abandoned.

BACKGROUND OF THE INVENTION

The present invention relates to a knock-down wheelbarrow and to fastening devices for such wheelbarrow.

U.S. Pat. No. 117,085 to Lawrence discloses a wheelbarrow that has jointed sides that collapse. U.S. Pat. No. Des. 239,125 to Vota shows a toy wheelbarrow. U.S. Pat. No. Des. 168,503 to Hallas discloses a flower planter. U.S. Pat. No. 3,506,319 to Tunnell discloses a knock-down miniature wheelbarrow. U.S. Pat. No. 2,381,618 to Roberts discloses a kiddie wheelbarrow. U.S. Pat. No. Des. 275,774 to Petersson et al discloses a toy wheelbarrow. U.S. Pat. No. 2,764,845 to Colombini discloses a knock-down wheelbarrow that is assembled using bolts.

Objects of the Invention

It is an object of the present invention to provide a knock-down wheelbarrow that is easily assembled without utilizing glue, nails or tools.

It is another object of the present invention to provide a knock-down wheelbarrow that is assembled using principally hand pressure.

It is a further object of the present invention to provide a knock-down wheelbarrow that, when assembled, is a strong and durable planter or wheelbarrow capable of withstanding many types of weather conditions.

It is another object of the present invention to provide a wheelbarrow that is collapsible into a compact configuration such that the wheelbarrow can be easily shipped.

SUMMARY OF THE INVENTION

The knock-down wheelbarrow includes four side units and a bottom unit that are generally planar. The side units and bottom unit form an open topped box structure. These units have respective interfacing surface portions that are adjacent each other. A plurality of partial bores are located on the interfacing surface portions. The side units and bottom unit are attached together via fastener pins. Each pin has radially protruding serrations and the serrations along each end length of each pin are oppositely disposed. Each pin is inserted into a pair of partial bores thereby locking the interfacing surfaces together. The knock-down wheelbarrow also includes a pair of support beams and each support beam includes a partial bore on a top surface, a partial bore on a bottom surface and a lateral through bore at a fore end of the beam. The wheelbarrow also includes a pair of legs having top end interfacing surfaces with partial bores therein. Fastener pins attach each leg to the bottom surface of a support beam. The knock-down wheelbarrow also includes a wheel with an axial through passage and an insertable, lockable axle which is adapted to be inserted through both lateral through bores of the support beams and the axial passage of the wheel when the wheel is intermediate the support beams.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENT

The present invention relates to a knock-down wheelbarrow and fastening devices therefor.

Figure 1:
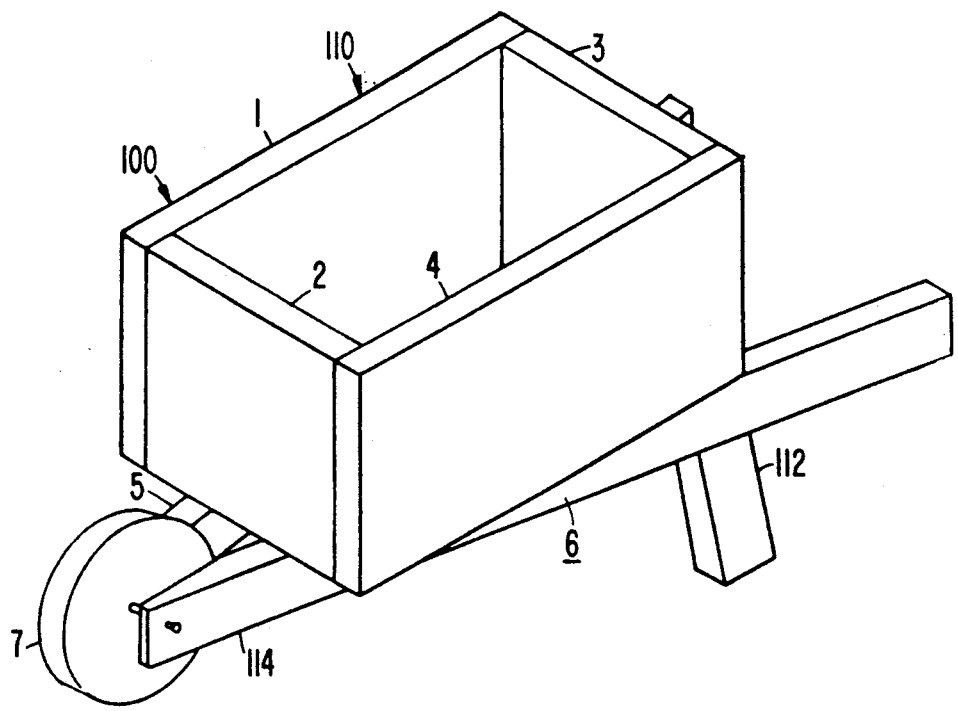
FIG. 1 is a perspective view of an assembled wheelbarrow in accordance with the principles of the present invention.

FIG. 1 is a perspective view of assembled wheelbarrow 100. Wheelbarrow 100 includes side units 1, 2, 3 and 4 set onto and attached to support beams 5 and 6. Not visible in FIG. 1 is a bottom unit that forms, in conjunction with the generally planar side units an open topped box 110. Depending from support beams 5 and 6 is a pair of legs, one of which is leg 112. At a fore end region 114 of the support beams, is disposed a wheel 7.

Figure 2:
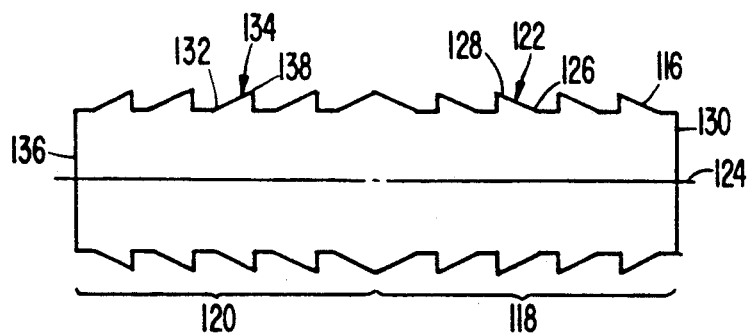
FIG. 2 is a cross-sectional, diagrammatic view of a fastener pin.

FIG. 2 illustrates a cross-sectional, diagrammatic view of fastener pin 116. Fastener pin 116 includes end length regions 118 and 120. Each end length region has oppositely disposed serrations. The serrations, for example serration 122, protrude radially from axial center line 124 of the pin and include a radially narrow leading edge 126 and a radially protruding lagging edge 128. The leading edges of the serration are closest to the corresponding pin end, such that serration 122 has leading edge 126 closest to pin end 130, as compared to the distance between lagging edge 128 and pin end 130. End length region 120 has oppositely disposed serrations such that leading edge 132 of serration 134 is closer to pin end 136, as compared to radially protruding lagging serration edge 138.

Figure 3:
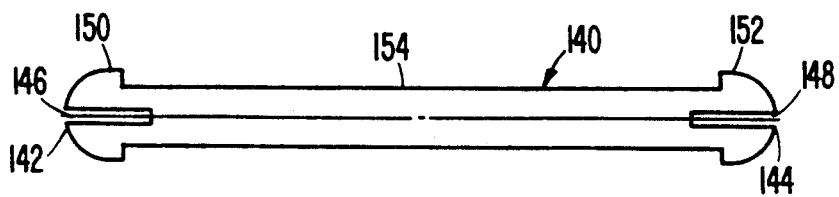
FIG. 3 is a cross-sectional, diagrammatic view of the insertable and lockable axle.
Figure 5:
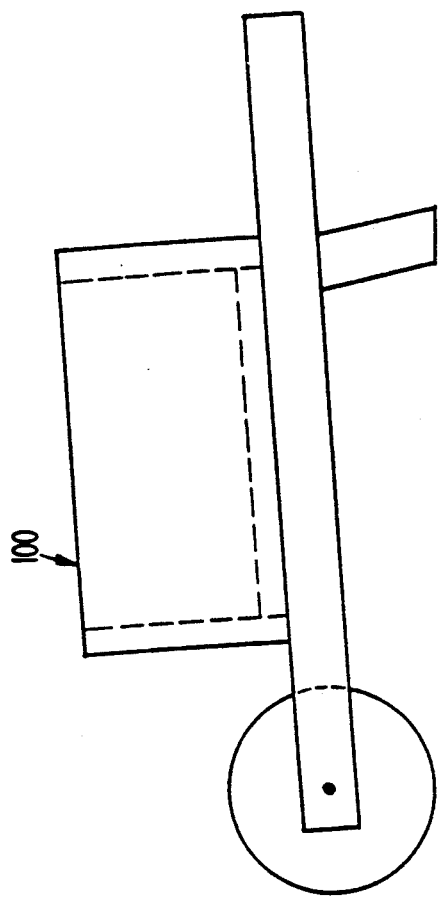
FIG. 5 is a side elevational view of the assembled wheelbarrow.

FIG. 3 illustrates a cross-sectional, diagrammatic view of an insertable and lockable axle 140. Axle rod 140 has split axle ends 142 and 144 that define open ended slots 146 and 148, respectively. Axle rod 140 also includes exterior end regions 150 and 152 that have a greater radially extent than an inboard region 154 of the rod. Split axle ends 142 and 144 are resilient such that those ends can be radially compressed or retracted for insertion through lateral through passages in fore end region 114 of support beams 6 and 5.

Figure 4:
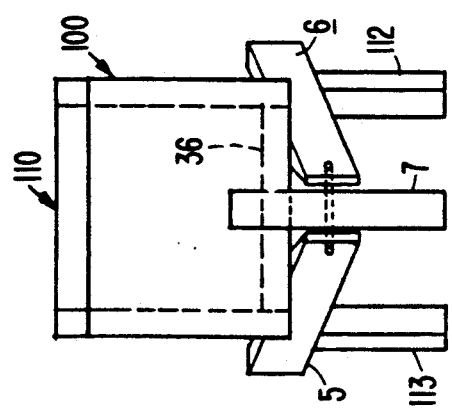
FIG. 4 is a front elevational view of the wheelbarrow.
Figure 7:
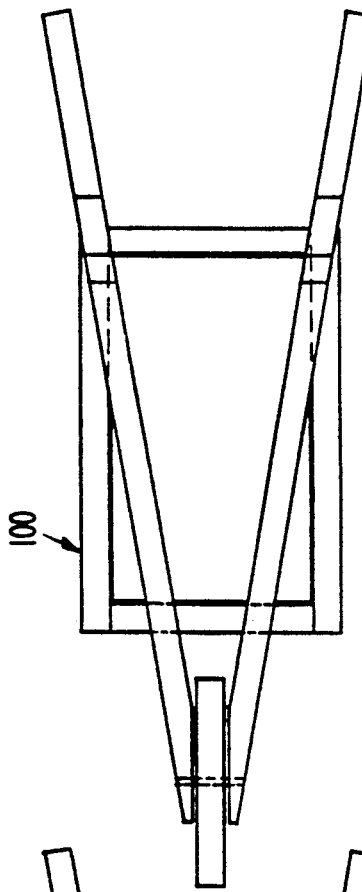
FIG. 7 is a bottom view of the assembled wheelbarrow.
Figure 6:
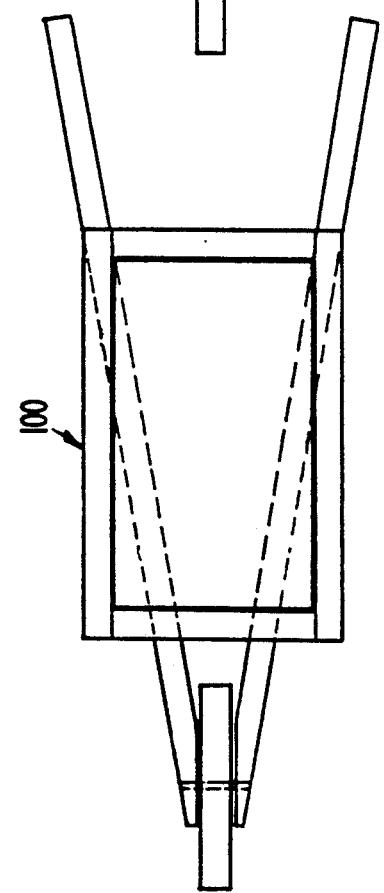
FIG. 6 is a top view of the assembled wheelbarrow.

FIGS. 4, 5, 6 and 7 respectively illustrate front elevational, side elevational, top and bottom views of assembled wheelbarrow 100. FIG. 4 illustrates the construction of open topped box structure 110 that includes bottom unit 36 defining the lower regions of the structure. Legs 112 and 113 depend from support beams 6 and 5.

Figure 8:
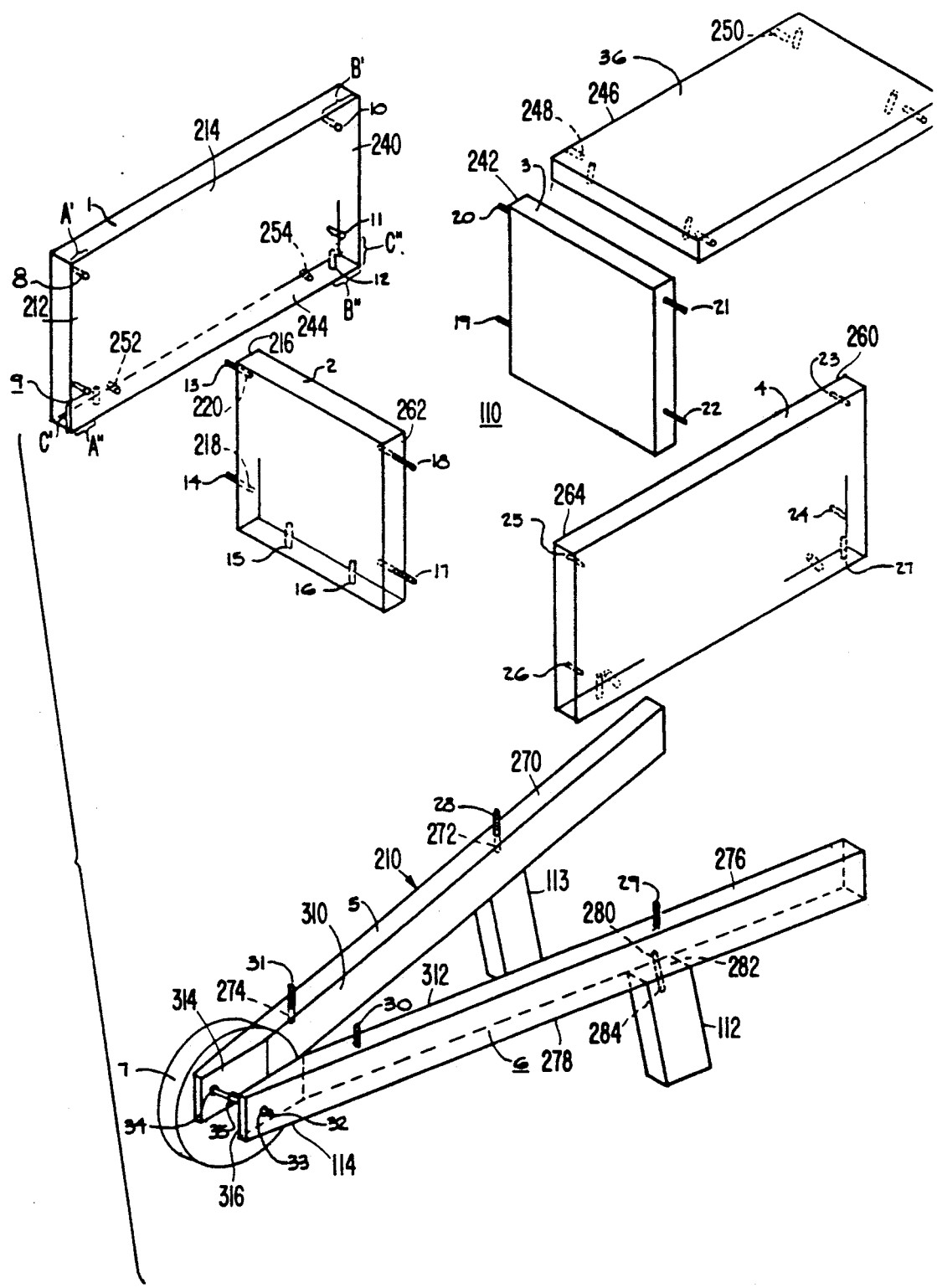
FIG. 8 is a exploded view of the wheelbarrow.

FIG. 8 shows an exploded view of the knock-down wheelbarrow with the lower support structure 210 in an assembled mode and the upper, box-like structure 110 in a disassembled mode. The four side units 1, 2, 3 and 4 each have interfacing surface portions. For example, side 1 has an interfacing surface portion 212 that spans the surface area A'—A" on interior surface 214. The interfacing surface portion 212 of side 1 is defined when end surface 216 of side 2 is placed adjacent surface region 212. There is also an interfacing surface portion on surface 216 of side 2. A plurality of partial bores are disposed on the interfacing side portions. Therefore, partial bores 8 and 9 are disposed in interfacing surface portion 212. Partial bores 218 and 220 are disposed on interfacing surface portion 216. Additionally, fastener pins 13 and 14 are inserted into partial bores 220 and 218. Fastener pins 13 and 14 are constructed in a manner similar to the fastener pin illustrated in FIG. 2. The radially protruding serrations press against the side walls of the partial bores thereby locking the pins in the bores. Preferably, the depth of each partial bore is about one-half the length of the fastening pin. Accordingly, the end length of each pin is completely inserted into a partial bore.

Side units 1 and 2 ar attached together by inserting the pre-mounted fastening pins 13 and 14 into partial bores 8 and 9. The interference fit between fastening pins 13 and 14 and partial bores 8 and 9 lock and attach side unit 1 to side unit 2. Side unit 1 includes a second interfacing surface portion 240 that extends along surface end region B'—B". Surface portion 240 is placed against end surface 242 of rear side unit 3. Partially mounted pins 19 and 20 are inserted into partial bores 11 and 10 to attach rear side unit 3 to right side unit 1. Side unit 1 includes a third interfacing surface portion 244 that spans end region C'''C''. Surface portion 244 is defined when bottom unit 36, and particularly side surface 246, is placed next to right side unit 1. Fastening pins would be pre-mounted into partial bores 248 and 250, for example, and then those fastening pins would be inserted partial bores 252 and 254 in region 244 of right side unit 1.

Left side unit 4 is attached to rear side unit 3 and front side unit 2 in a similar manner in that partially mounted fastening pins 21 and 22 are inserted into partial bores 23 and 24 in the respective interfacing surface portion 260 of side unit 4. Pre-mounted fastening pins 17 and 18 extending from interfacing surface edge 262 of front side unit 2 are inserted into partial bores 26 and 25 in interfacing surface portion 264 of side unit 4. Bottom unit 36 is also mounted or attached to right side unit 1 and left side unit 4 via fastening pins placed in partial bores.

Support subassembly 210 is constructed in a similar manner. Right support beam 5 includes, on its top surface 270, two partial bores 272 and 274 into which are placed fastening pins 28 and 31. Left support beam 6 includes fastening pins 29 and 30 placed in partial bores on top surface 276. Legs 112 and 113 depend from the lower surfaces of support beams 6 and 5. Particularly, support beam 6 has a lower surface 278 which has a partial bore 280 disposed therein. A fastening pin is placed in partial bore 280. Leg 112 includes a top end interfacing surface 282 that has a partial bore 284 therein. By placing a fastening pin into partial bores 280 and 284 that are aligned, leg 112 is mounted on bottom surface 278 of support beam 6.

Wheel 7 is mounted at fore end 114 of support beam 6. Support beams 5 and 6 are assembled such that they are angularly disposed with respect to each other. Wheel 7 is placed at the apex of the angle formed by the support beams. Each support beam has an inboard surface 310 and 312 that has a fore end inboard surface 314 and 316. End surfaces 314 and 316 define a parallelly spaced apart wheel interspace. Fore end inboard surfaces 314 and 316 are angularly disposed at an obtuse angle with respect to the planar surface of inboard surfaces 310 and 312.

Wheel 7 is disposed between wheel interfacing, inboard surfaces 314 and 316.

Each support beam 5, 6 includes a lateral through passage 34, 33 respectively passing through the beam. Each lateral through passage is generally parallel to the top and bottom surfaces of the support beam. For example, lateral through passage 33 is parallel to top surface 276 and bottom surface 278. Wheel 7 includes axial through passage 35. An axle 32 is inserted through through passages 33, 35 and 34. Axle 32 is constructed as shown in FIG. 3. Axial through passage 35 has a slightly greater radial extent as compared to the inboard region 154 of axle rod 140 (FIG. 3) or axle 32 (FIG. 8). This ensures that wheel 7 can freely rotate on rod 32. However, the diameter of the lateral through passages 33 and 34 is less than the exterior diameter of the compressible axle ends. Accordingly, the split axle ends are compressed to enable the axle rod to be inserted into a lateral through passage, the axial passage of the wheel and the second lateral through passage. Thereafter, the axle end expands and locks the axle rod on the support beams.

Figure 9:
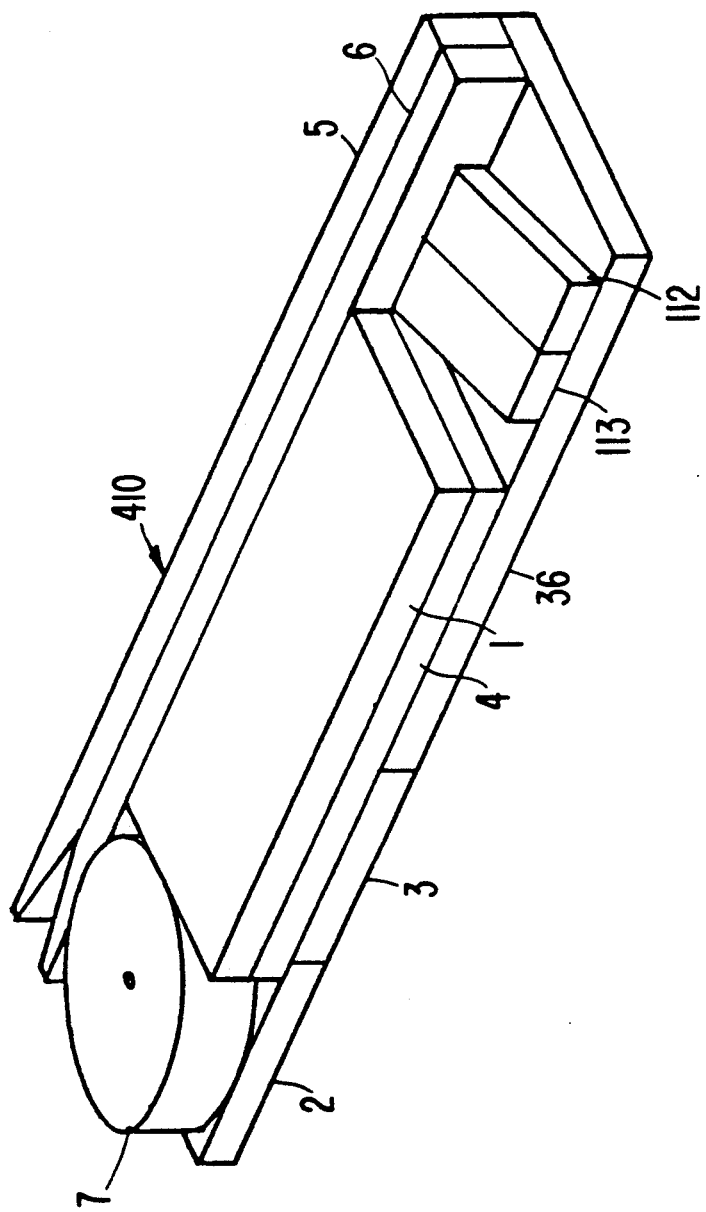
FIG. 9 is a perspective view of the wheelbarrow in its compact mode prior to assembly.

FIG. 9 illustrates the knock-down wheelbarrow in a compact or shipping mode 410. Bottom unit 36 and front and rear side units 2 and 3 are disposed in a lower shipping plane. Wheel 7 and side units 1 and 4 are disposed thereabove. Also, depending legs 112 and 113 are placed above bottom unit 36. Support beams 5 and 6 are also located above the lower shipping plane.

The claims appended hereto are meant to cover modifications and changes within the spirit and scope of the present invention.

What is claimed is:

1. A knock-down wheelbarrow comprising:
four side units and a bottom unit that are generally planar, each said side unit and bottom unit having a plurality of smooth partial bores on interfacing surface portions, a respective interfacing surface portion on a corresponding unit being adjacent another respective interfacing surface portion defined when said four side units and said bottom unit are configured as an open topped box structure;
a pair of support beams each having:
at least one smooth partial bore in a top surface thereof;
a smooth partial bore in a bottom surface thereof; and,
a lateral through bore at a fore end thereof, said through bore extending parallel to said top and bottom surfaces of the respective beams;
the wheelbarrow further including:
a pair of legs each having a top end interfacing surface with a smooth partial bore therein;
a wheel with an axial through passage;
a plurality of fastener pins equal to at least one-half of the number of smooth partial bores, each pin having radially circumferential protruding serrations, each end length of each pin having oppositely disposed serrations such that radially protruding edges of commonly disposed serrations are remote from a corresponding pin end; each said pin adapted to be inserted into a pair of smooth partial bores by hand pressure thereby locking said pins in said pair of smooth partial bores and locking interfacing surfaces together;

an insertable and lockable one piece integral axle, said axle having opposing ends which further include axial end slots defining opposing split axle ends, said split axle ends being resilient such that corresponding split axle ends are capable of being compressed when inserted through both said lateral through bores and said axial passage of said wheel and such that said corresponding split axle ends resiliently expand when said corresponding ends protrude beyond said wheel when said wheel is intermediate said support beams, said axle rotatably retaining said wheel;

said side units, said bottom unit, said support beams, said legs, and said wheel being sized to collectively fit within a compact rectilinear, solid geometric space delineated by the total thickness of three side units, the length of said support beams and the width of the bottom unit before said wheelbarrow is assembled.

2. A knock-down wheelbarrow as claimed in claim 1 wherein the length of said pins is no greater than twice the depth of said partial bores.

3. A knock-down wheelbarrow as claimed in claim 2 wherein said partial bores have a circular cross-section and said pins have a circular cross-section.

4. A knock-down wheelbarrow as claimed in claim 1 wherein said bottom unit has at least two partial bores in a bottom surface, and when said side and bottom units are configured as said open topped box, said bottom unit is attached to the top surface of said pair of support beams with corresponding pins placed in aligned partial bores in said top surface of said support beams and said bottom surface of said bottom unit; said legs being attached to said bottom surface of said support beams with corresponding pins disposed in aligned partial bores in said top end interfacing surfaces of said legs and said bottom surface of said support beams.

5. A knock-down wheelbarrow as claimed in claim 1 wherein when assembled, said support beams are angularly disposed with respect to each other and said wheel is placed at an apex of said angle formed by said support beams.

6. A knock-down wheelbarrow as claimed in claim 5 wherein each said support beam includes a wheel interface surface, the pair of wheel interface surfaces of said support beams being parallelly spaced apart and said wheel being disposed between said wheel interfacing surfaces when said wheelbarrow is assembled.

7. A knock-down wheelbarrow as claimed in claim 6 wherein said axle is an axle rod having said split axle ends, said axle rod including exterior end regions that have a greater radial extent than an inboard region of said axle rod.

* * * * *